Figure 1:
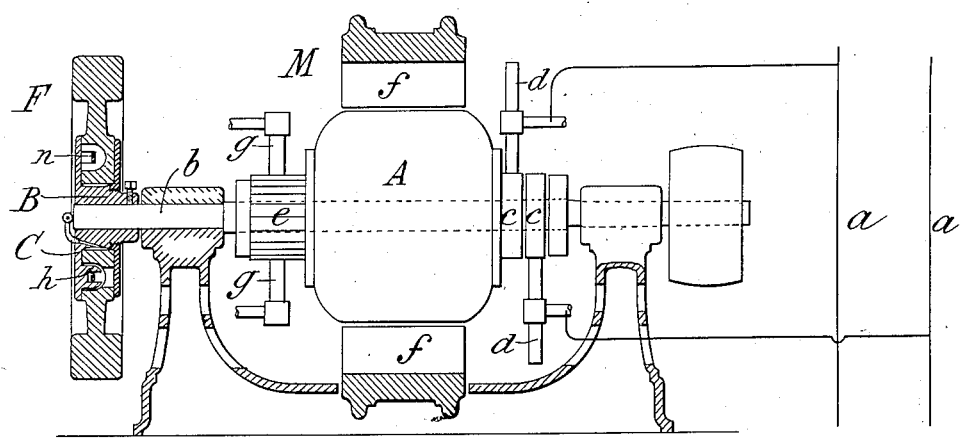

No. 724,645. PATENTED APR. 7, 1903.
J. J. WOOD.
MEANS FOR PREVENTING FLUCTUATIONS IN ROTARY MOTORS.
APPLICATION FILED MAY 31, 1900.
NO MODEL.

WITNESSES:
Fred White
Thomas S. Wallace

INVENTOR:
James J. Wood,
By Attorneys,

UNITED STATES PATENT OFFICE.

JAMES J. WOOD, OF FORT WAYNE, INDIANA, ASSIGNOR TO THE GENERAL ELECTRIC COMPANY, A CORPORATION OF NEW YORK.

MEANS FOR PREVENTING FLUCTUATIONS IN ROTARY MOTORS.

SPECIFICATION forming part of Letters Patent No. 724,645, dated April 7, 1903.

Application filed May 31, 1900. Serial No. 18,646. (No model.)

*To all whom it may concern:*

Be it known that I, JAMES J. WOOD, a citizen of the United States, residing at Fort Wayne, in the county of Allen and State of Indiana, have invented certain new and useful Improvements in Means for Preventing Fluctuations in Rotary Motors, of which the following is a specification.

The object of this invention is to prevent or reduce fluctuations occurring in "rotary motor devices," by which term I mean to include prime movers—such as steam-engines, turbines, impact-wheels, or the like—and also secondary motor devices—such, for example, as dynamo-electric generators, electric motors, rotary converters, and the like.

My invention finds its most important application to "synchronous alternating dynamo-electric machines," by which term I mean to include alternating generators, alternating synchronous motors, and rotary converters. My invention is applicable wherever in such a rotary motor fluctuations are liable to occur from a uniform rotation by reason either of variations in the propulsive energy or variations in the work or load, which variations recur at frequent intervals, so that they tend to produce alternate accelerations and retardations of the motor, such as are known in the art as "hunting" or "pumping."

To make my invention fully apparent, I will proceed to describe the same in its application to a synchronous alternating motor. In operating such motors it is well known that when the dynamo or generator fluctuates in speed in different parts of a revolution (as occurs when the generator is driven by an engine the propulsive thrust of which varies at different periods of each revolution) the motor tends to hunt or pump—that is, its armature runs sometimes a little faster and sometimes a little slower than the generator, with the result of causing a beating sound in the motor and of disturbing the circuit, as will be indicated hereinafter. Such hunting or beating action is usually indicative of some irregularity in the circuit feeding the motor. This irregularity may consist of variations either in speed or in electromotive force. The variation in speed of the generator tends to cause a corresponding variation in the speed of a synchronous motor. The motor cannot, however, assume instantly the speed required by the new speed of the generator. When the speed of the generator increases, the motor-armature begins to increase in speed; but by reason of its lagging the motor receives an increased current, because its armature is not in normal position for the new frequency and because additional current is required for supplying the energy necessary for increasing its speed. This additional current produces a difference of magnetism of the field, which must again be altered when the generator speed decreases below the average. The motor is therefore undergoing a slight variation in speed, which seeks to approximate to, but does not exactly correspond with, that of the generator. This pumping or rocking or hunting effect, however, will almost entirely disappear when even a small load is put on the motor. It has heretofore been the custom to weaken the field of a synchronous motor when it was found to pump. The effect of this is to lower the electromotive force of the motor, thereby putting an artificial load on the armature, which, however, while it reduces the pumping, has the disadvantage of reducing the electromotive force of the generator and of upsetting the line. To overcome this defect and avoid interference with the line, it has been proposed to apply a fly-wheel to the shaft of the motor through the medium of a yielding connection comprising a spring or springs under tensile strain. It has been found in practice, however, that this construction is not an efficient one, as the springs and connections quickly break in use. By my invention I aim to provide an improved construction of such a device, wherein this defect is avoided. I hence provide a spring connection between the fly-wheel and shaft, wherein the spring or springs act by compression to produce the desired effect, and I provide stops for limiting the relative movement of the fly-wheel and motor-shaft, so that the degree of compression which may be applied to the springs is limited, and provide means for guiding the springs concentrically with the axis of the wheel. The effect of such fly-wheel is to prevent the objectionable pumping action referred to. If the generator speed suddenly increases, the armature tends to correspondingly accelerate its speed; but the fly-wheel lags behind, thereby putting a slight load on the motor, and then when the generator slows down the motor-armature tends to run slower, while the fly-wheel, tending to run at a uniform speed, catches up with the motor-shaft and forces it ahead or resists its tendency to slow down, thereby again putting a slight load on the motor. I have already stated that putting a slight load on a synchronous motor extinguishes the pumping effect, this being equally true whether it is electrical, by weakening the field and taking extra current, or is mechanical, by throwing some additional work upon the motor. Such yieldingly-connected fly-wheel is of the latter order and has the effect of causing the motor to run without any pumping. Inasmuch as the load imposed by the fly-wheel is felt only at the instants when the variation in speed occurs, its effect in correcting the pumping is accompanied by less loss of energy than with a load which imposes a continuous drag on the motor.

Figure 2:
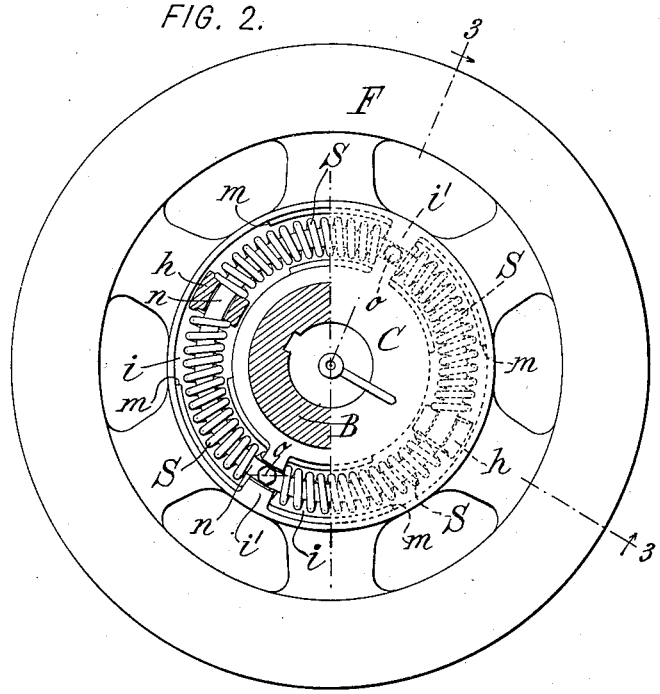
Figure 3:
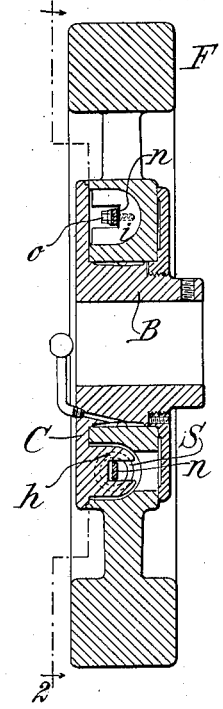
Figure 3:

In the accompanying drawings, Figure 1 is sectional elevation of a motor or other synchronous dynamo-electric machine provided with the preferred form of my invention. Fig. 2 is a face view of the fly-wheel, showing one-half of the shaft-collar in section on the line 2 2 in Fig. 3. Fig. 3 is a transverse section of the fly-wheel and collar in two planes, as denoted by the line 3 3 in Fig. 2.

In Fig. 1 I have shown what may, for example, be understood as an alternating motor of well-known type or as a rotary converter. In this figure, $f$ is the field-magnet, A is the armature, $b$ is the armature-shaft, $c\ c$ are the collector-rings, and $d\ d$ are the brushes leading the alternating current into these rings. I have shown this machine as constructed with a commutator $e$ for feeding continuous current to brushes $g\ g$ for the purpose of exciting the field-magnet; but these exciting connections not being material to my invention are not shown.

Referring to Fig. 1, on the armature-shaft $b$ (or any other shaft driven therefrom) is mounted a fly-wheel F. The preferred construction is that shown in Figs. 1 to 3, where the fly-wheel F is loosely mounted upon a sleeve B, which itself is keyed or otherwise fixed upon the shaft. Attached to the shaft is a collar or flange C, which is preferably made in one piece with the sleeve B and which has one or more (preferably two) projections $h\ h$, each of which constitutes two opposed abutments. The fly-wheel F has preferably two arc-shaped chambers or grooves $i\ i$, which are formed in such manner as to leave webs or abutments $i'\ i'$. The chambers $i\ i$ are adapted to receive the projections $h\ h$ of the collar C and to inclose springs S, preferably coiled or helical springs, as best shown in Fig. 2. I preferably use four springs S, each extending between one of the projections $h$ of the collar C and the adjacent abutment $i'$ of the fly-wheel F. Each pair of springs thus affords an elastic and resilient connection for resisting relative movement of the fly-wheel and shaft in either direction. To guide the springs in the chambers $i$, I preferably employ a ring $n$, which is shown as formed in two parts and as held within the chambers $i$ by suitable bolts $o$. The webs $i'$ are preferably recessed to receive the ring $n$, as shown in Fig. 3, which is thus held centrally within the chambers $i\ i$. Each of the springs S encircles the ring $n$ with a loose fit, so that while held in its appropriate chamber $i$, out of contact with the walls of the latter, it may move freely along the ring when compressed or extended by relative displacement of the fly-wheel and shaft. This relative movement is limited by shoulders $m\ m$, formed upon the fly-wheel, which extend into the path of the projections $h\ h$. The relative displacement thus provided for should be such that if the fly-wheel were held stationary the shaft could be turned enough to displace the armature from one field-pole to the next. The stops limit the compression or stress which may be applied to the springs S S, and thereby prevent overstraining the springs.

The device provided by my present invention is exceedingly efficient and practically free from danger of breakage.

It will be understood that the chambers $i\ i$ might be formed in the collar C instead of the hub of the fly-wheel with as good results. This and other similar modifications are, however, within the scope of my invention, which is not limited to the exact construction shown.

With the construction described the load imposed during periods of speed variation is (in addition to unavoidable friction) proportional to the compression of the springs, and this compression during the period of lagging is given back by the expansion of the springs during a succeeding period of acceleration, so that the load necessary to suppress pumping is economized.

Instead of applying the fly-wheel directly on the armature-shaft it may be applied on any shaft driven therefrom.

It is to be understood that my improved device may be interposed at any point between the fly-wheel and motor, so long as it serves to produce the effect described.

Although for convenience of illustration I have hereinbefore described my invention in detail as applied to an alternating motor, it is to be understood that my invention is by no means limited to this specific application. In fact, it finds its greatest utility in its application to rotary converters of any of the ordinary types well known in the art, to which it is applied in precisely the manner hereinbefore described with particular reference to a synchronous motor. To this end the foregoing description may be understood as though such rotary converter were specifically mentioned in lieu of the synchronous alternating motor, and Fig. 1 may be understood as specifically illustrating one type of such rotary converter.

By the term "fly-wheel" as used in this specification I include not merely such a wheel as a mechanic would ordinarily understand by this term, but also any suitably symmetrical mass or masses so mounted and adapted as to act in a manner substantially equivalent to the action of a fly-wheel—that is to say, by rotating with the motor and by reason of its inertia resisting any acceleration or retardation of its normal speed of rotation.

I claim as my invention the following-defined novel features, substantially as hereinbefore specified, namely:

1. The combination with a rotary motor, of a fly-wheel driven thereby, free to turn relatively thereto, a spring interposed between said fly-wheel and motor for producing the effect described, and a guide for said spring comprising a ring concentric with the axis of rotation of said fly-wheel.

2. The combination with a rotary motor, of a shaft rotating therewith, a fly-wheel driven by said shaft and free to turn relatively thereto, said fly-wheel having arc-shaped chambers, a collar fixed to said shaft having projections entering said chambers, coiled springs interposed between said projections and fly-wheel and inclosed in said chambers, and guides within said chambers for guiding said springs therein, comprising a ring fixed to said fly-wheel and concentric with the axis of rotation of the latter.

3. The combination with a rotary motor, of a shaft rotating therewith, a fly-wheel driven by said shaft and free to turn relatively thereto, said fly-wheel having two arc-shaped chambers, and shoulders between said chambers, a guide-ring extending within said chambers and fixed to said shoulders, a collar fixed to said shaft, and having projections entering within said chambers said projections embracing said ring, and four springs each encircling said ring, and at one end bearing against one of said shoulders, and at the other end bearing against one of said projections, whereby to resist relative movement in either direction of said fly-wheel and collar.

In witness whereof I have hereunto signed my name in the presence of two subscribing witnesses.

JAMES J. WOOD.

Witnesses:
  A. L. HADLEY,
  W. H. CRIGHTON.